US005615994A

United States Patent [19]
Gasser

[11] Patent Number: 5,615,994
[45] Date of Patent: Apr. 1, 1997

[54] ARTICLE CONVEYING, GROUPING AND STORING APPARATUS

[75] Inventor: Markus Gasser, Gächlingen, Switzerland

[73] Assignee: SIG Schweizerische Industrie-Gesellschaft, Neuhausen am Rheinfall, Switzerland

[21] Appl. No.: 443,224

[22] Filed: May 17, 1995

[30] Foreign Application Priority Data

May 25, 1994 [CH] Switzerland ............ 1614/94

[51] Int. Cl.$^6$ ................................................. B65G 57/03
[52] U.S. Cl. .................... 414/794.2; 198/418.4; 198/429; 198/431; 414/794.7
[58] Field of Search .............. 198/418.4, 429, 198/430, 431, 797; 414/789.6, 791, 793.4, 794.2, 794.7

[56] References Cited

U.S. PATENT DOCUMENTS

| | | | |
|---|---|---|---|
| 2,992,721 | 7/1961 | Eger | 198/797 |
| 3,340,995 | 9/1967 | Olson | 198/797 |
| 3,349,928 | 10/1967 | Howard | 198/797 |
| 3,403,794 | 10/1968 | Lopez | 198/429 |
| 4,399,905 | 8/1983 | Lance et al. | 198/430 |
| 4,802,570 | 2/1989 | Hirsch et al. | 198/430 |
| 5,018,334 | 5/1991 | Guttinger et al. | 198/429 |

*Primary Examiner*—Joseph E. Valenza
*Attorney, Agent, or Firm*—Spencer & Frank

[57] ABSTRACT

An apparatus for conveying, grouping and storing flat articles includes a storing device which has a plurality of gondolas each having a plurality of vertically spaced, generally horizontally oriented, superposed storing shelves; a gondola support and conveying mechanism for carrying the gondolas and moving them in a predetermined travelling path; an input station situated along the travelling path for presenting the gondolas in succession to receive articles; and an output station situated along the travelling path for presenting the gondolas in succession to discharge articles. There are further provided a conveyor situated at the input station for advancing articles thereto and for placing articles on the storing shelves of the gondola dwelling in the input station; and a grouping device for removing articles from the superposed storing shelves of the gondola dwelling in the output station and for forming article stacks of the removed articles.

15 Claims, 7 Drawing Sheets

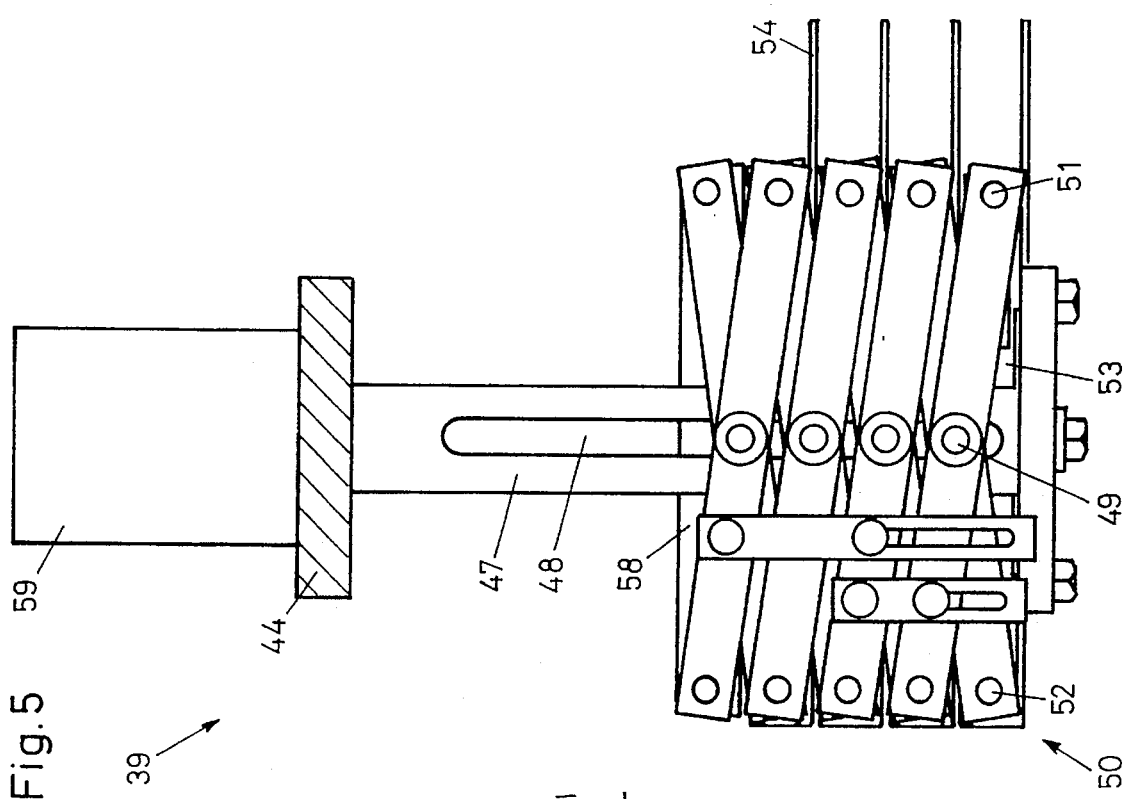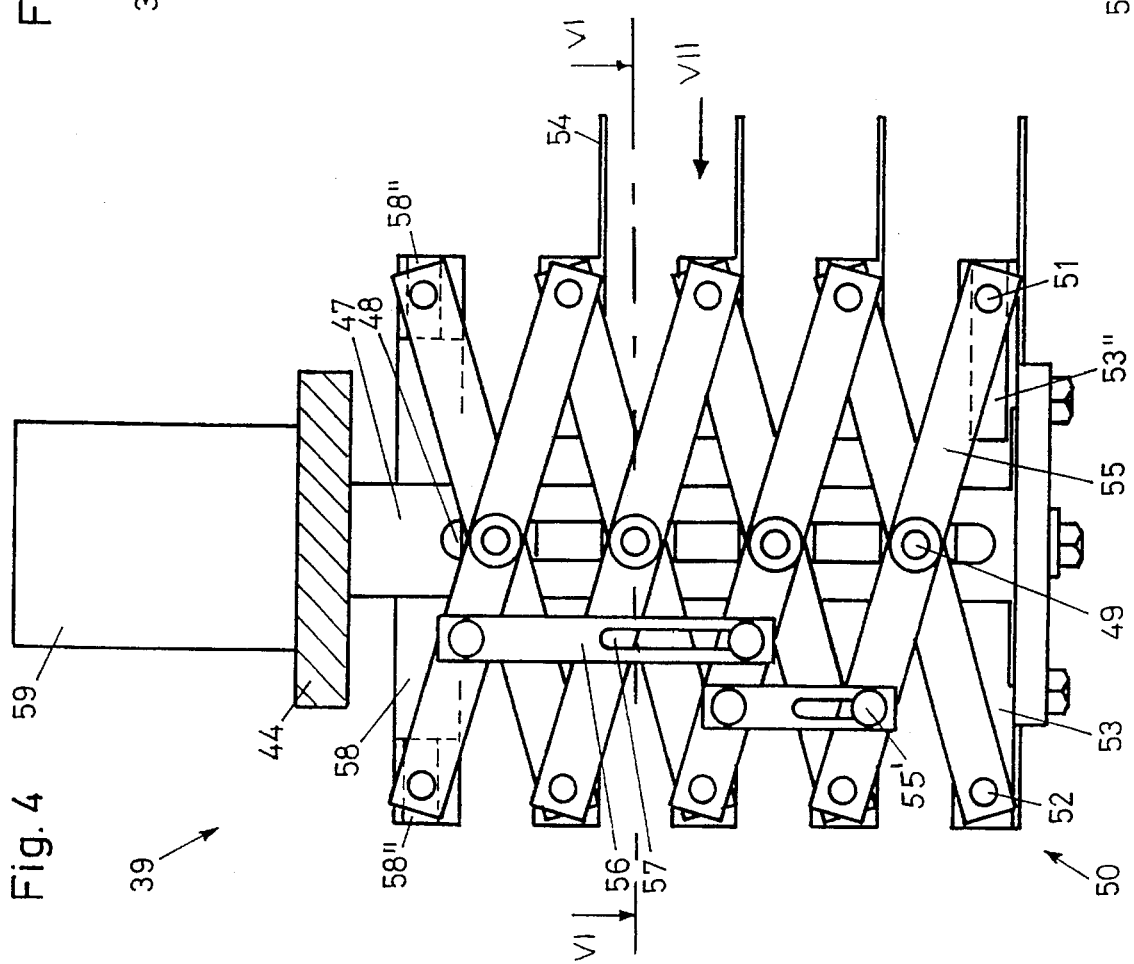

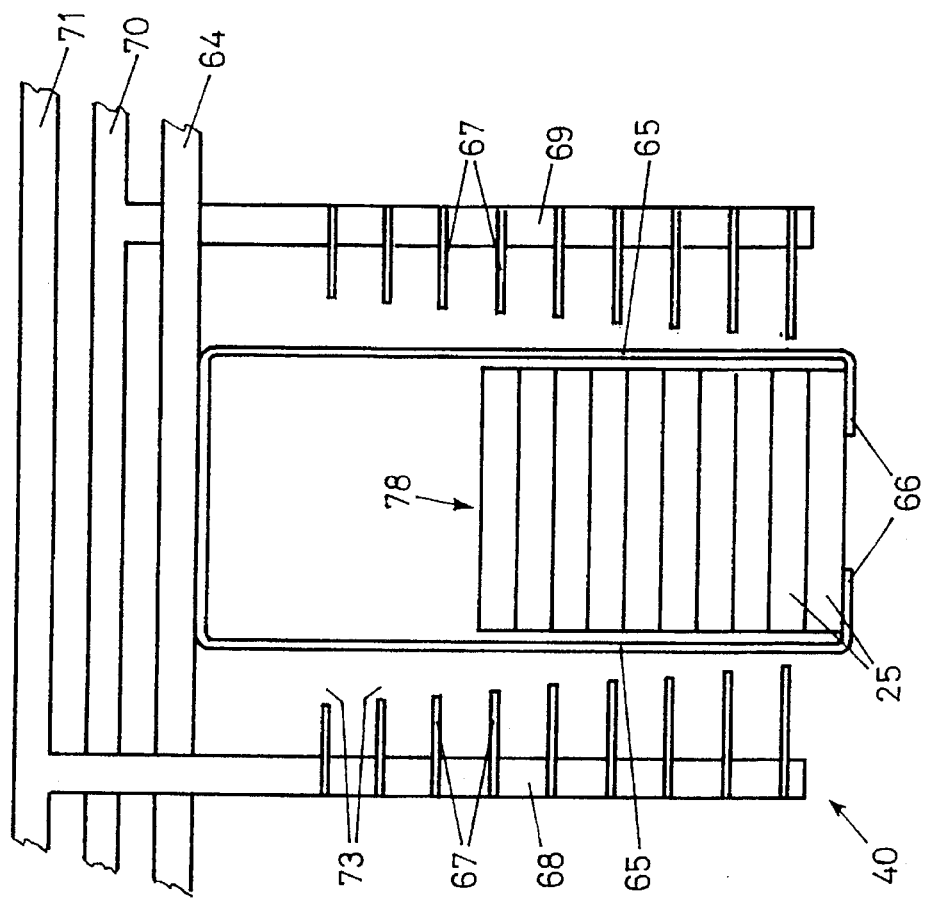
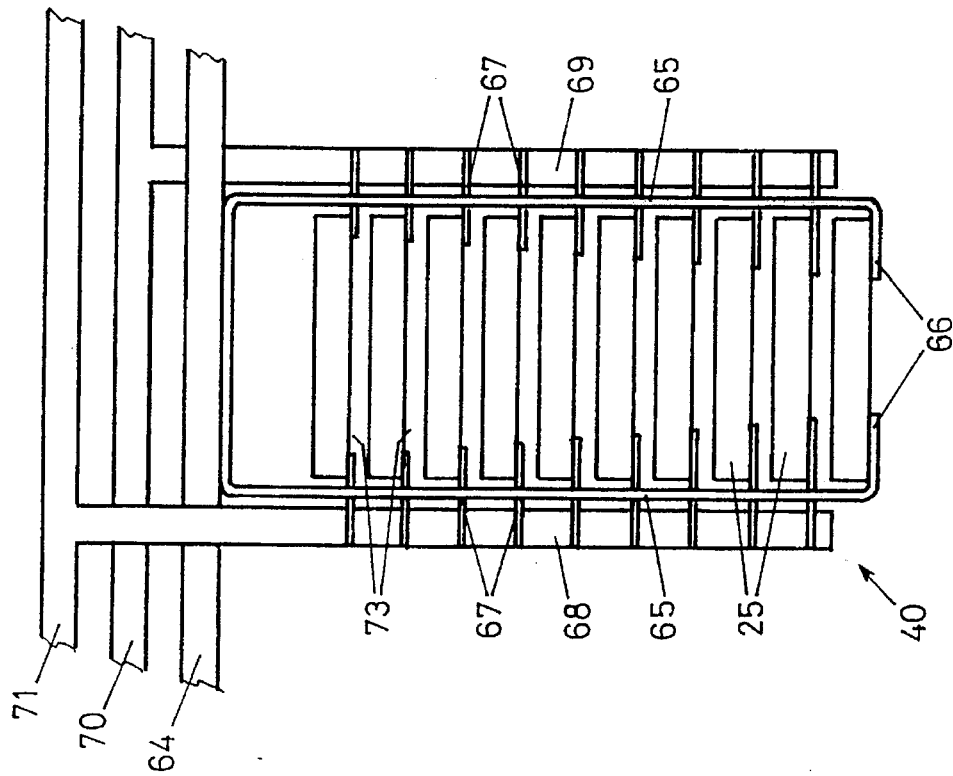

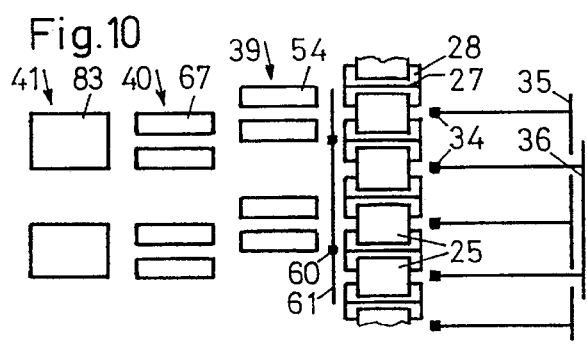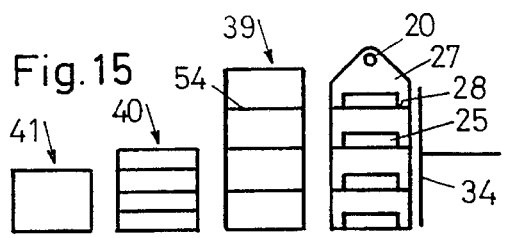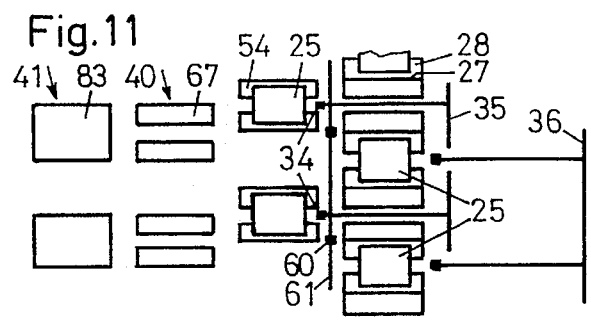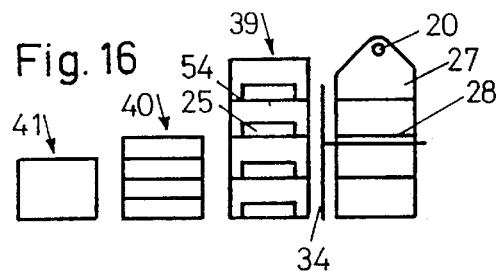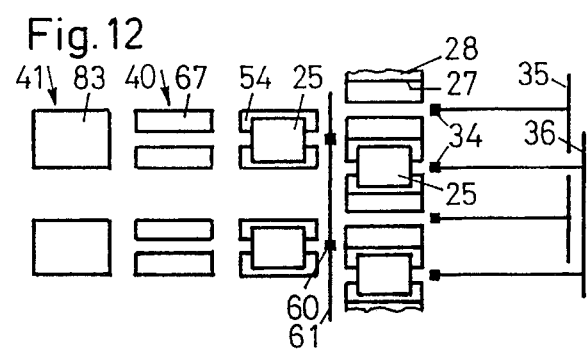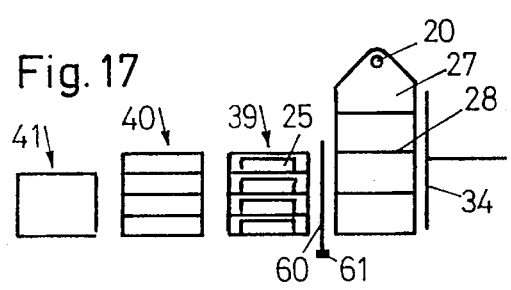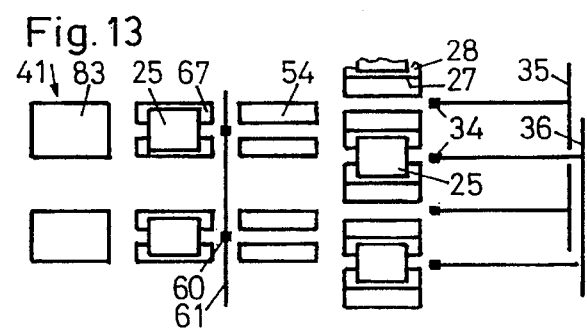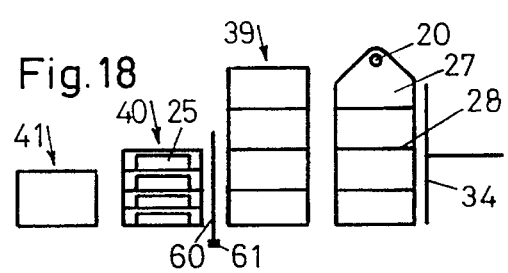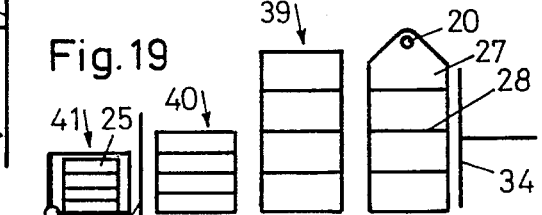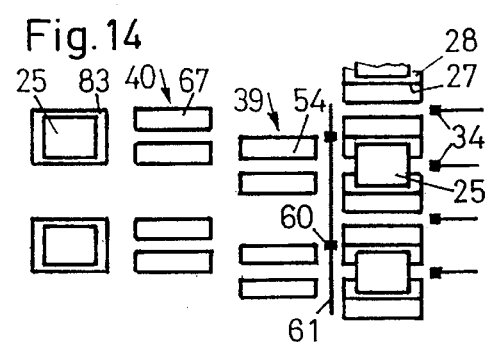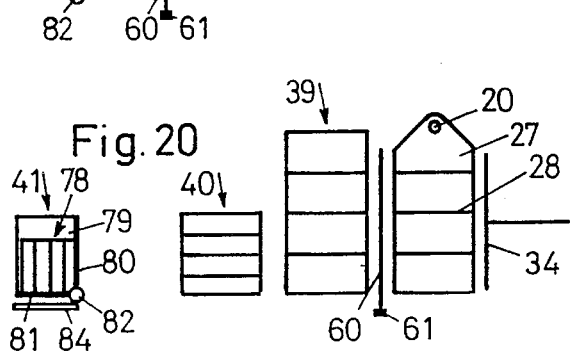

5,615,994

ARTICLE CONVEYING, GROUPING AND STORING APPARATUS

CROSS REFERENCE TO RELATED APPLICATION

This application claims the priority of Swiss Application No. 1614/94-9 filed May 25, 1994, which is incorporated herein by reference.

BACKGROUND OF THE INVENTION

This invention relates to an apparatus for conveying, grouping and storing flat articles such as food products for the ultimate purpose of supplying them to a packing machine. The article storing device of the apparatus has an inlet station from which the products are moved by gondolas in which they are positioned on gondola shelves. The storing device further has an outlet station at which the products exit in the same orientation as they entered through the inlet station. The carrier gondolas move past the inlet and outlet stations in a vertical travel path.

Published European Patent Application 534 902 discloses a storing device comprising gondolas which are suspended from chains and each of which is provided with a plurality of shelves. The shelves, as the gondola passes by an inlet station in a vertical travel path, are charged with flat-lying articles. The articles are pushed onto a conveyor belt or the like in an outlet station.

SUMMARY

It is an object of the invention to provide an apparatus of the above-outlined type by means of which flat-lying articles may be stacked into groups in a gentle and rational manner.

This object and others to become apparent as the specification progresses, are accomplished by the invention, according to which, briefly stated, the apparatus for conveying, grouping and storing flat articles includes a storing device which has a plurality of gondolas each having a plurality of vertically spaced, generally horizontally oriented, superposed storing shelves; a gondola support and conveying mechanism for carrying the gondolas and moving them in a predetermined travelling path; an input station situated along the travelling path for presenting the gondolas in succession to receive articles; and an output station situated along the travelling path for presenting the gondolas in succession to discharge articles. There are further provided a conveyor situated at the input station for advancing articles thereto and for placing articles on the storing shelves of the gondola dwelling in the input station; and a grouping device for removing articles from the superposed storing shelves of the gondola dwelling in the output station and for forming article stacks of the removed articles.

BRIEF DESCRIPTION OF THE DRAWINGS

FIGS. 4 and 5 are enlarged side elevational views of a collecting device forming part of the apparatus according to the invention and shown in two different operational positions.

FIGS. 8 and 9 are schematic front elevational views of a stacking device forming part of the apparatus according to the invention and illustrated in two different operational positions.

FIGS. 10–14 are schematic top plan views of the outlet station of the collecting device according to the invention showing different operational positions.

FIGS. 15–20 are schematic side elevational views of the outlet station showing operational positions corresponding to FIGS. 10–14, respectively.

DESCRIPTION OF THE PREFERRED EMBODIMENTS

Figure 1:
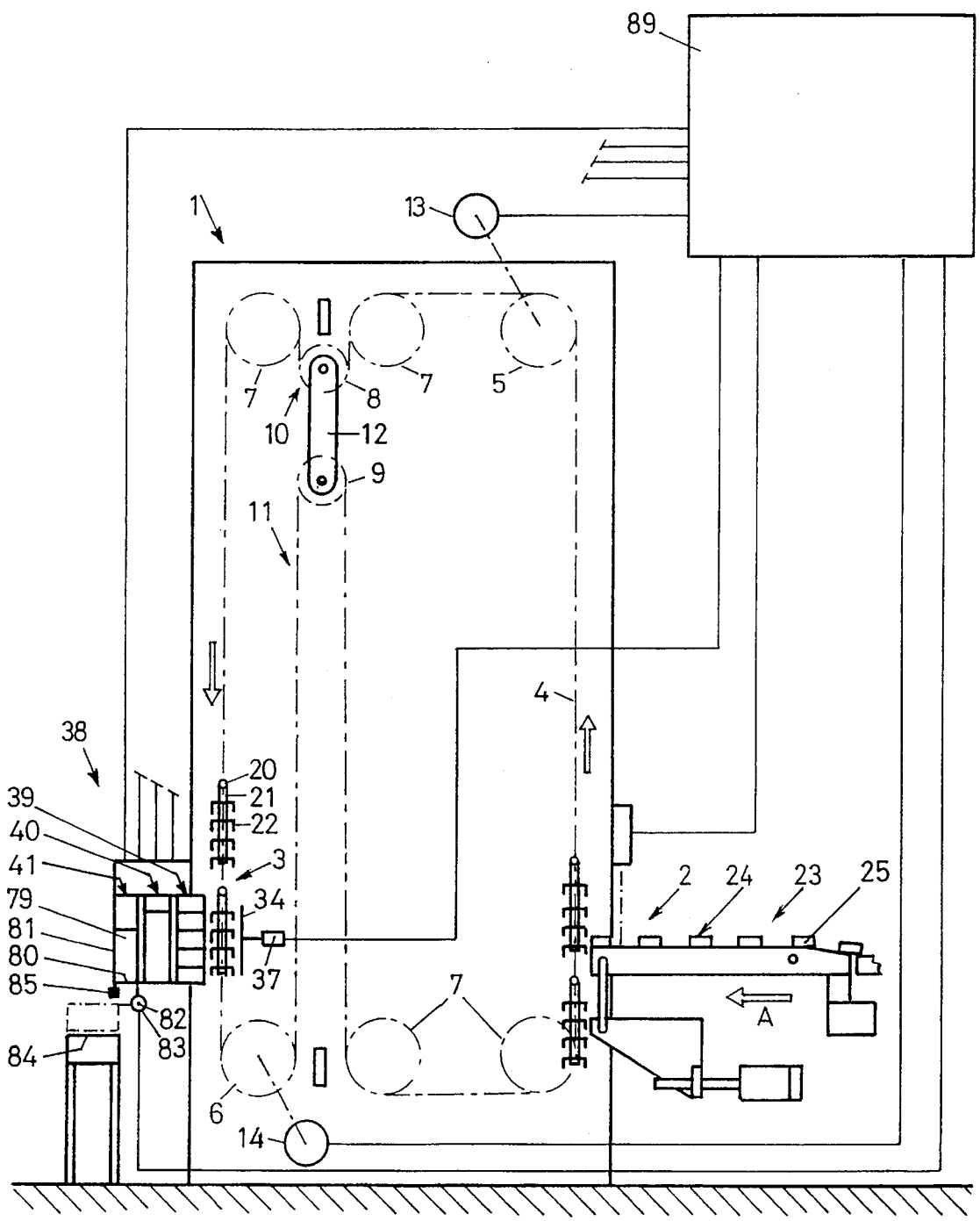
FIG. 1 is a schematic side elevational view of the apparatus according to a preferred embodiment of the invention.

Turning to FIG. 1, the apparatus shown includes a storing device 1 which has an input station 2 and an output station 3. The storing device 1 has two parallel-extending, synchronously driven endless chains 4 supported by sprockets 5, 6, 7, 8 and 9. The chain deflected by two upper sprockets 7 and a sprocket 8 forms a chain loop 10 while the chain deflected by adjacent lower sprockets 6 and 7 and a sprocket 9 forms a chain loop 11. The sprockets 8 and 9 are supported on a common sled 12 which is vertically displaceable on non-illustrated rails. Two coaxial deflecting sprockets 5 of the two chains 4 on the input side of the storage loop 10 are driven by a common motor 13. Two coaxial deflecting sprockets 6 on the input side of the storage loop 11 are driven by a motor 14 independently from the motor 13. If the average speed of the motor 14 is less than that of the motor 13, the charged storage loop 10 will become longer and the empty storage loop 11 will become shorter; thus, the storage device 1 is being filled. If, conversely, it is the motor 14 whose average rpm is greater, then the storing device 1 is emptied.

At uniform distances on the chains 4 gondolas 21 are suspended for pivotal motion about respective support shafts 20. Each gondola 21 is provided with a plurality of horizontal, superposed storing shelves 22 which, inside the gondolas 21, are uniformly spaced from one another. FIG. 1 shows only four shelves 22 for each gondola 21; in reality, each gondola may have a significantly larger number of shelves.

At the input station 2, rows 24 of articles 25 are pushed onto the shelves 22 by means of a supply conveyor 23. The article rows 24 are aligned with the conveying direction A. The supply conveyor 23 may be of a structure identical to that described in Published European Patent Application 534 902 which is incorporated herein by referencee.

Figure 2:
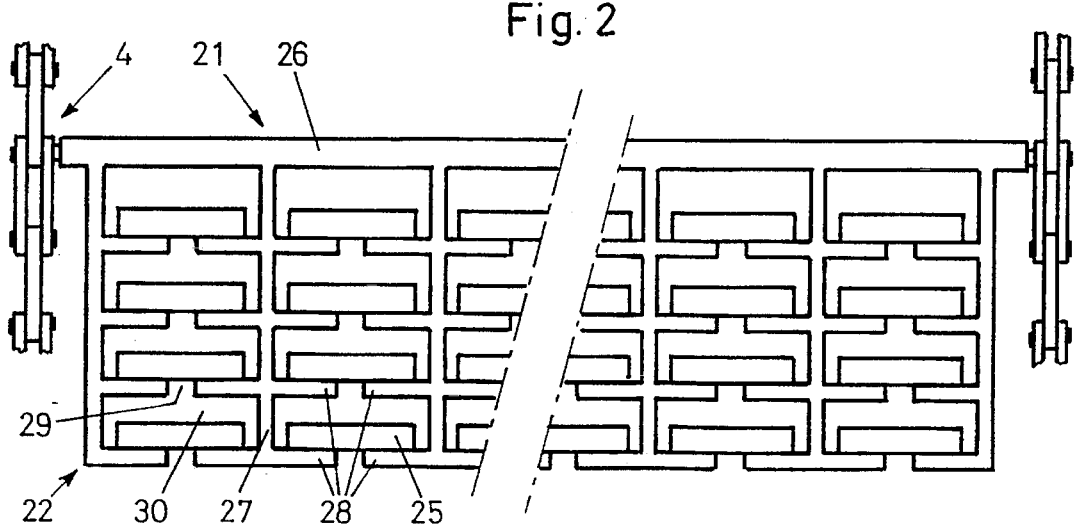
FIG. 2 is a schematic front elevational view of a gondola of the apparatus shown in FIG. 1.
Figure 6:
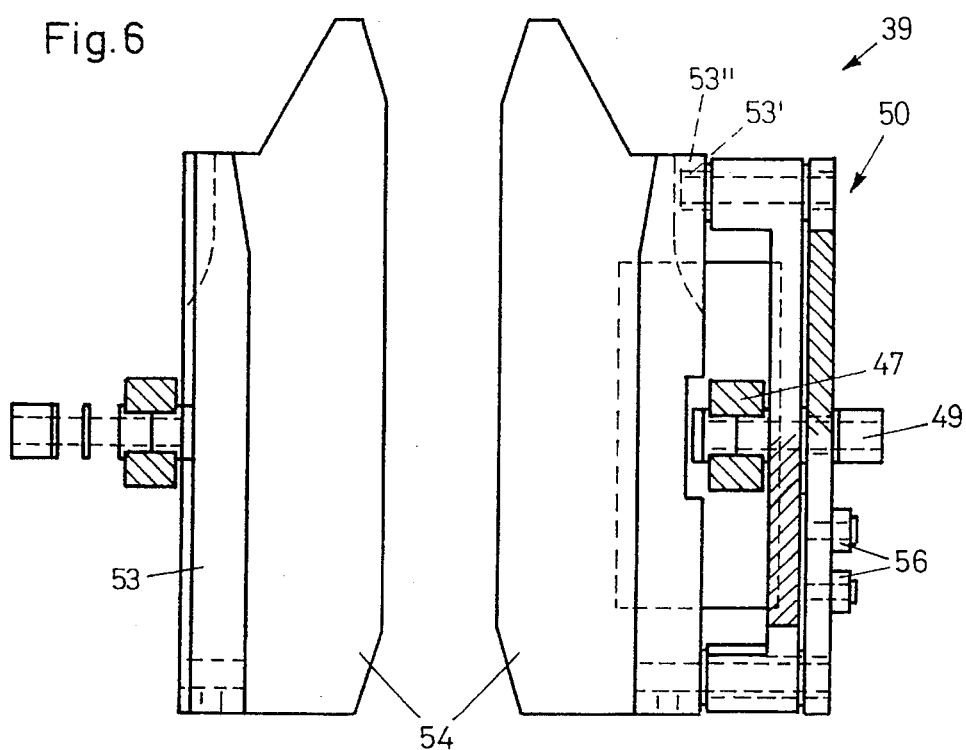
FIG. 6 is a sectional top plan view taken along line VI—VI of FIG. 4.
Figure 7:
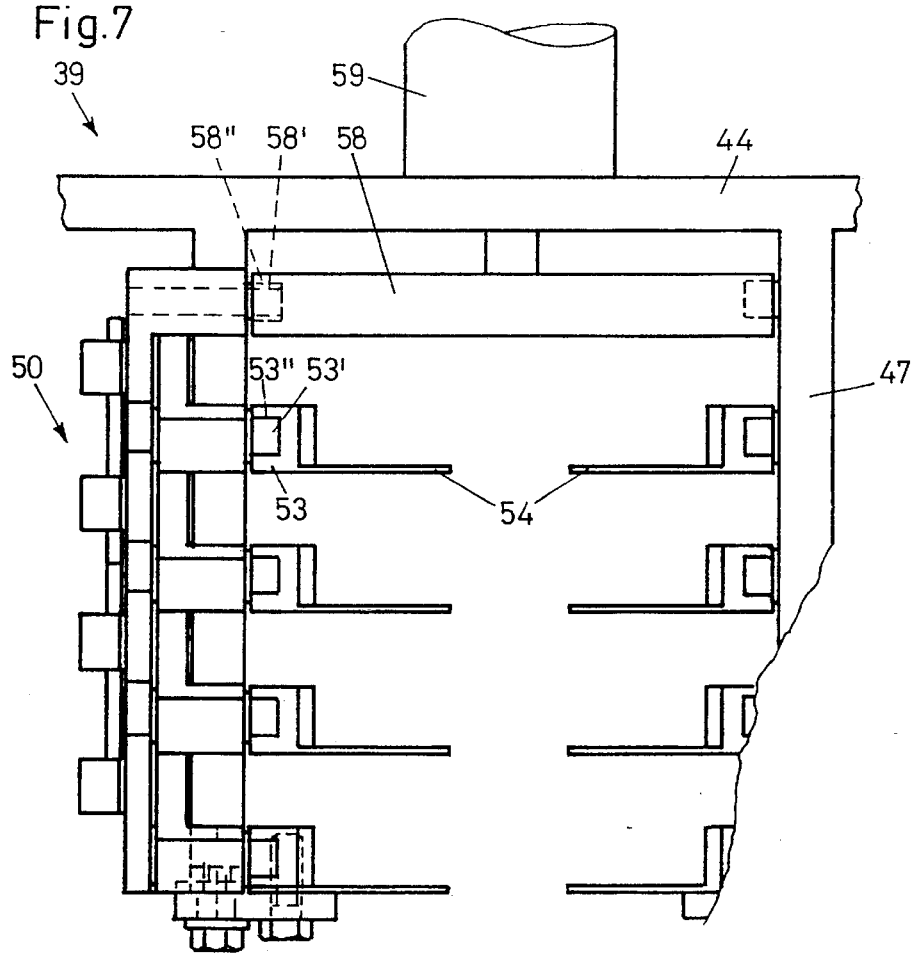
FIG. 7 is a front elevational view of the construction shown in FIG. 4, as viewed in the direction of the arrow VII.

Turning to FIG. 2, each gondola 21 includes a through-going carrier bar 26 having opposite ends which are pivotally supported in the chains 4. At uniform distances vertical guide plates 27 project downwardly from the carrier bar 26. The horizontal shelves 22 are formed of mutually horizontally spaced shelf halves 28, secured to the guide plates 27. The gaps 29 defined between the shelf halves 28 are in vertical alignment with one another. The shelf halves 28 and the guide plates 27 define individual compartments 30 into which an article row 24 formed of articles 25 is inserted.

Figure 3:
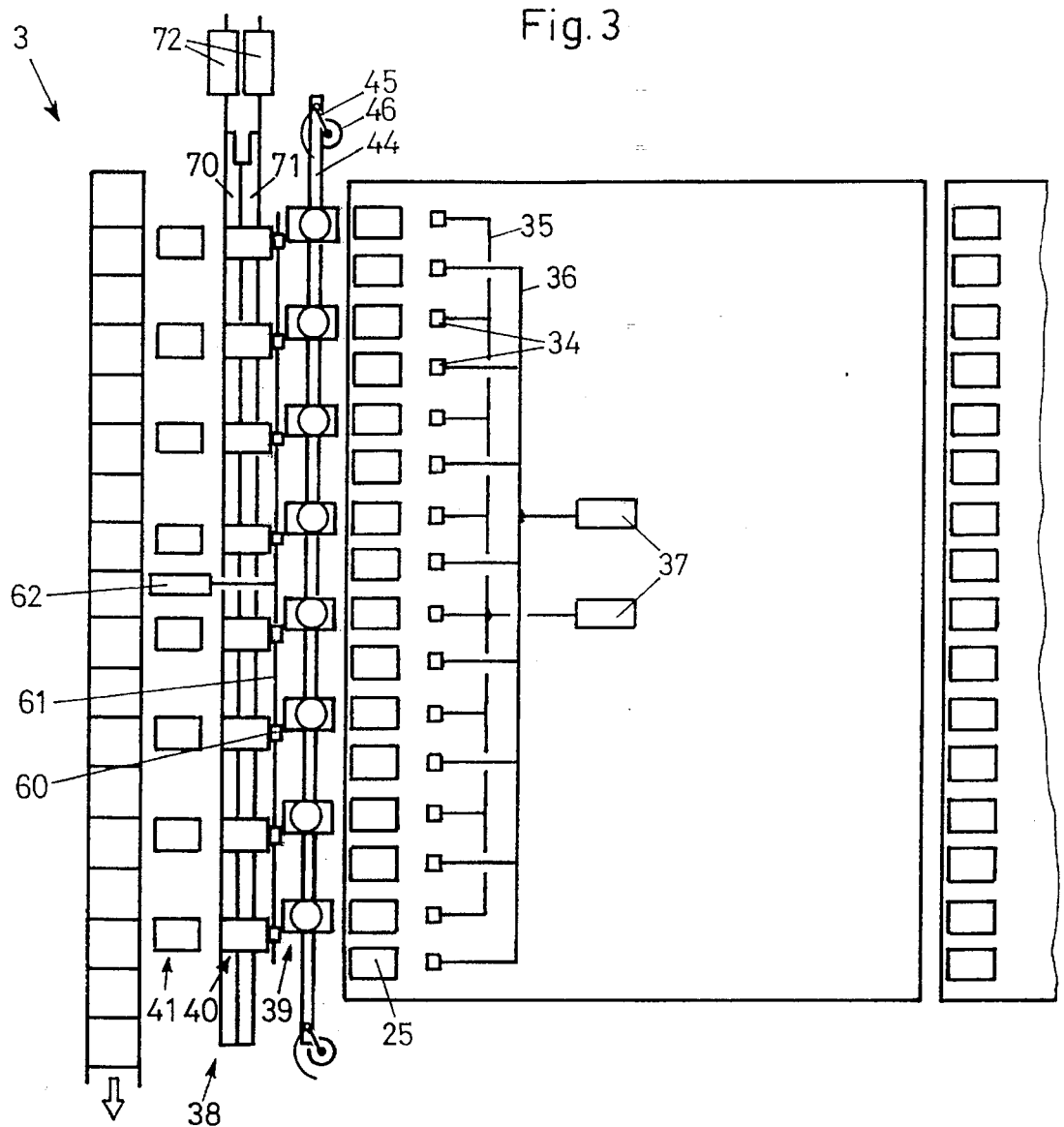
FIG. 3 is a schematic top plan view of an outlet station of the construction shown in FIG. 1.

Turning to FIG. 3, the outlet station 3 has two rows of vertically oriented rod-like pushers 34. One row of the pushers 34 is secured to a first carrier 35 whereas the second row of the pushers 34 is mounted on a second carrier 36. The distance between adjoining pushers 34 of each carrier is twice the distance of the articles 25 on the shelves 22 or the distance of adjoining lateral guide plates 27 from one another. The carriers 35 and 36 are moved by separate actuating devices 37. Upon energization of the respective actuating device 37 the pushers 34 displace all superimposed articles 25 from the shelves 22 into a grouping device 38.

The grouping device 38 is formed of a row of collecting devices 39, a row of stacking devices 40 and a row of depositing devices 41. The number of the collecting devices 39, stacking devices 40 and depositing devices 41 is half the number of the horizontally side-by-side arranged compartments 30 of a shelf 22 in a gondola 21. The lateral center-to-center distance between collecting devices, stacking devices and depositing devices is twice the distance between laterally adjoining guide plates 27 of each gondola 21. In this manner, while fully utilizing the storage width for the article storage, sufficient space is provided for the structure of the collecting devices 39, the stacking devices 40, the depositing devices 41 as well as the article-supply and actuating devices.

The collecting devices 39 are mounted on a common carrier bar 44 which is suspended at its opposite ends on horizontal pivot levers 451. One of the pivot levers 45 is pivotally displaceable by a motor 46 into three positions in steps which have a length that is one fourth of the center-to-center distance between the collecting devices 39. In both end positions the collecting devices 39 are in alignment with a respective superimposed column of compartments 30 of the gondolas 21. In the mid position, on the other hand, the collecting devices 39 are in alignment with the after-connected stacking devices 40. In this manner, the articles 25 may be pushed out of the collecting devices 39 into the stacking devices 40 with separate pushers 60. The vertical, rod-like pushers 60 are secured to a common beam 61 which is displaceable by a power cylinder 62.

FIGS. 4–7 illustrate details of a collecting device 39. To the carrier bar 44 two vertical support bars 47 are secured, each provided with a slot 48 extending along the length of the bar 47. The center joints 49 of a lazy tongs construction 50 are guided in the slots 48. The outer joints 51, 52 of the lazy tongs 50 carry shelf supports 53 with lateral guides. To each shelf support 53 an inwardly-extending collecting shelf half 54 is secured. Two horizontally adjoining collecting shelf halves form one collecting shelf. The two lowermost shelf supports 53 are secured to the support bars 47 and are allowed a slight horizontal play. The pins of the joints 52 are fixedly connected with the shelf supports 53. The pins of the joints 51, on the other hand, are provided with rollers 53' which are slightly horizontally displaceable in the slots 53" provided in the shelf supports 53. To ensure that even after an extended operational period the shelf halves 54 remain at uniform distances from one another, on several lazy tongs links 55 spacer members 56 are mounted. The spacer members 56 are formed of vertically-extending straps which are, at their upper end, jointed with a lazy tongs link 55 and, at the lower end, have a slot 57 into which extends a pin 55' affixed to another lazy tongs arm 55. The two uppermost joints 51, 52 of each side are supported in a common plate 58 which may be lowered by means of a pneumatic cylinder 59 from an upper limit position (FIG. 4) in which the vertical distance between the shelf halves 54 equals the vertical distance between the gondola shelves 22, into a lower limit position (FIG. 5) in which the vertical distance between the shelf halves 54 of the collecting device 39 is significantly reduced. The two uppermost joints 51 and 52 have respective rollers 58' received in slots 58" of the plate 58.

In FIGS. 8 and 9 a stacking device 40 is illustrated in more detail. Each stacking device 40 has two lateral guide plates 65 secured to a carrier bar 64 which is common to all stacking devices 40. The two lateral guide plates 65 are interconnected at the top and are bent at the bottom rectangularly toward one another so that two lowermost, immovable shelf halves 66 are formed onto which the lowest article 25 is pushed from the respective collecting device 39. Additional stacking shelf halves 67 are secured to vertical carriers 68 and 69 situated on either side of the guide plates 65. Two horizontally adjoining stacking shelf halves form one stacking shelf. The right-hand carrier 69 and the left-hand carrier 68 are secured to respective carrier bars 70 and 71 which extend parallel to the carrier bar 64 from which the guide plates 65 are suspended. In the base position shown in FIG. 8, the shelf halves 67 project through respective slots in the guide plates 65 into the inner space 73 defined between the two guide plates 65. The carrier bars 70, 71 are, by means of two power cylinders 72 (shown in FIG. 3), moved in mutually opposite directions from the base position shown in FIG. 8 in which the shelf halves 67 support the articles 25, into the withdrawn position shown in FIG. 9 in which the shelf halves 67 have been pulled laterally outside of the guide plates 65. Because the space 73 between the shelf halves 67 becomes upwardly progressively wider in the horizontal direction, upon such a shifting of the carrier bars 70, 71 the articles 25 drop progressively onto one another from a small height so that the articles 25 are handled very gently and may be stacked without mutual friction generated on their large surfaces.

The article stack 78 formed in the above-described manner is pushed by the identical pushers 60 from the stacking devices 40 into the downstream-arranged depositing devices 41. The pushers 60 are moved through the clearance 73 defined between the shelf halves 66 and between the shelf halves 67. The depositing devices 41 have lateral guide walls 79, a support base 80 and a rear wall 81. The depositing devices 41 are mounted on a common shaft 82 and are pivotal through 90° by means of a motor 83 from the solid-line base position shown in FIG. 1 into the dash-dotted, lowered position in which the rear walls 81 lie directly above a conveyor belt 84. The rear walls 81 are secured to a bar 85 which is displaceable by means of a non-illustrated power cylinder relative to the shaft 82 parallel to its length direction so that the rear walls 81 are withdrawn and thus the stacks 78 are deposited onto the conveyor belt 84 whereupon the depositing devices 41 are pivoted back into their base position. Thereafter, the article stacks 78 are moved away by the conveyor belt 84.

In the description which follows, the operation of the above-described apparatus will be set forth, particularly in conjunction with FIGS. 10-20.

The motor 14 is stopped and held stationary when the shelves 28 of a filled gondola 21 are in alignment with the shelves 54 of the collecting device 39. Such a motor control may be effected, for example, by means of a non-illustrated sensor. This condition is shown in FIGS. 10 and 15.

Thereafter, the row of pushers 34 is advanced by means of the carrier 35 which is in alignment with the collecting devices 39 and the groups of articles 25 are pushed onto the shelves 54 of the collecting devices 39 (FIGS. 11 and 16). The pushers 34 return into their base position. The collecting devices 39 are lowered from their base position (FIG. 4) into a position shown in FIG. 5 by simultaneously actuating all cylinders 59. At the same time, the collecting devices are pushed by means of the motor 46 into a mid position in which they are situated centrally in front of the pushers 60 and are in alignment with the stacking devices 40 (FIGS. 1 and 17).

By means of the pushers 60 the article groups are pushed from the collecting devices 39 into the stacking devices 40 (FIGS. 13 and 18). The shelf halves 67 of the stacking devices 40 are displaced by means of the power cylinder 72 laterally beyond the guide walls 65 so that individual stacks 78 are formed from the groups of articles 25. The stacks 78 are pushed into the depositing devices 41 by the pushers 60 (FIG. 19). The pushers 60 thereafter return into their initial position and the collecting devices 39 are pushed into their other end position (FIG. 14). At the same time, the stacks 78 are deposited onto the conveyor belt 84 by pivoting the depositing devices 41 by means of the shaft 82 and by displacing the rear walls 81 by means of the non-illustrated power cylinder (FIG. 20) on which the stack 78 is carried away. This condition is illustrated in FIG. 20. Then the stacks 78 are carried away by the conveyor. As the next step in the operation, the remaining articles 25 in the gondola 21 are placed in the same manner by the pushers 34, secured to the carrier 36, into the collecting devices 39 (FIGS. 13) and therefrom they are placed by the pushers 60 into the stacking devices 41 and by means of the depositing devices 41 onto the conveyor belt 84. Thereafter the chains 4 are further moved at the output side by one gondola division so that the cycle may be repeated.

The described apparatus according to the invention economizes space because the storage width may be utilized to its full extent since the articles 25 can be supported closely side-by-side on the shelves 22. The apparatus permits a direct stacking and edgewise orientation of the articles starting from flat-lying article rows and ensures a very gentle handling thereof. Attrition, pressure and impacts on the articles are avoided while a high output is ensured.

As a departure from the described embodiment, there may be provided but a single row of pushers 34 with a sole carrier bar 35 which is lengthwise slidable back and forth through a distance defined between adjoining guide plates 27.

Figure 21:
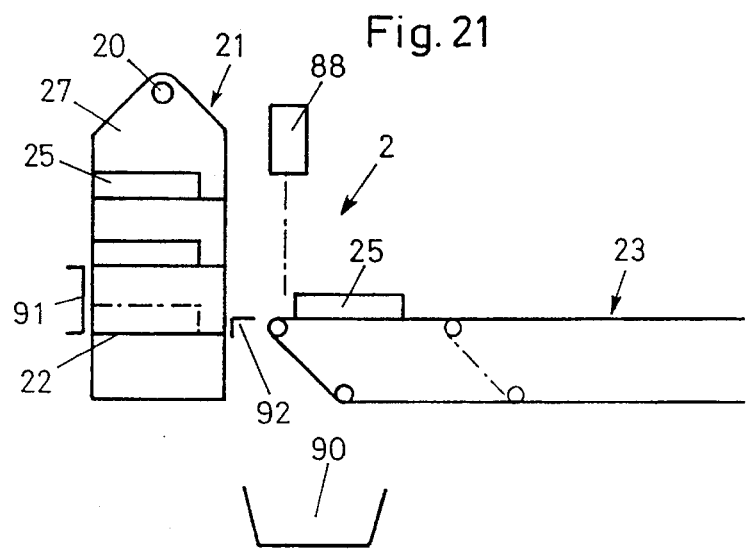
FIG. 21 is a schematic side elevational view of another preferred embodiment of the input station of the collecting device according to the invention.

FIG. 21 illustrates a variant of the input station 2 in which the supply conveyor 23 is stationary, that is, it is not movable vertically and accordingly, the motor 13 is energized stepwise. Immediately ahead of the transfer location a row of reflecting light barriers 88 is arranged. By means of the signals emitted by the light barriers 88 a control device 18 determines whether all articles 25 of the row are in a correct alignment. Should this not be the case, the supply conveyor 23 is withdrawn from its solid-line position into the dash-dotted position so that the articles 25 of this row fall into a collecting bin 90. This procedure prevents disturbances in case of incorrectly aligned rows in the storing device 1 or the output station 3.

Behind the gondola shelves 22 to be charged with articles a stationary abutment 91 is arranged to ensure that the articles 25 can be introduced at relatively high speed. Between the conveyor 23 and the gondola 21 a stationary intermediate plate 92 is secured which is situated slightly above the level of the shelves 22 to be charged and which serves to stop any article which may bounce back from the abutment 91.

The height between the shelves 22 may be more than twice the height of the articles, in which case during transfer the gondolas 21 are lowered to a slightly greater extent. In this manner, two or more rows of articles may be deposited onto the same shelves 22 to form a partial stack.

Figure 22:
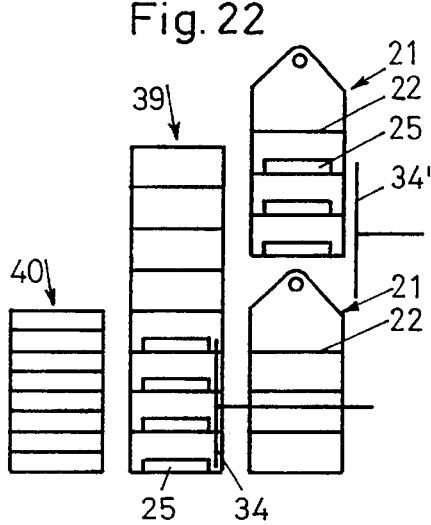
FIGS. 22 and 23 are schematic side elevational views of another preferred embodiment of the outlet station illustrating different operational positions.
Figure 23:
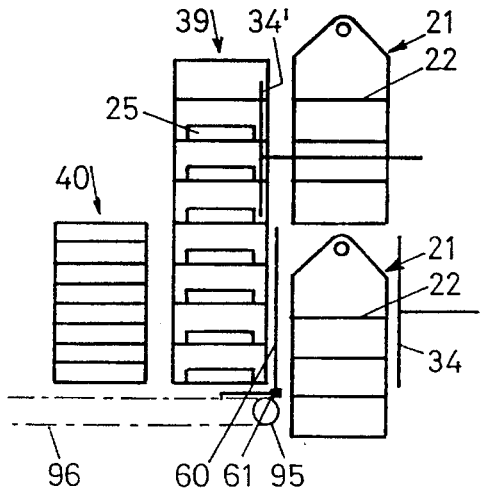

As seen in FIGS. 22 and 23, it is feasible to build a higher article stack by providing that the collecting devices 39, by means of two superposed pushers 34, 34' consecutively load two consecutively supplied gondolas 21. FIG. 23 shows that the pushers 60 with the support bar 61 are actuated by means of chains 96 guided about chain sprockets 95. The support bar 61 is secured to the chains 96. The sprockets 95 are driven by a non-illustrated motor.

It will be understood that the above description of the present invention is susceptible to various modifications, changes and adaptations, and the same are intended to be comprehended within the meaning and range of equivalents of the appended claims.

What is claimed is:

1. An apparatus for conveying, grouping and storing flat articles, comprising
   (a) a storing device including
       (1) a plurality of gondolas each having a plurality of vertically spaced, generally horizontally oriented, superposed storing shelves;
       (2) gondola support and conveying means for carrying said gondolas and moving said gondolas in a predetermined travelling path;
       (3) means defining an input station along said travelling path for presenting therein said gondolas in succession to receive articles; said travelling path being vertically oriented in said input station;
       (4) means defining an output station along said travelling path for presenting therein said gondolas in succession to discharge articles; said travelling path being vertically oriented in said output station;
   (b) conveying means situated at said input station for advancing articles to said input station and for placing articles on the storing shelves of the gondola dwelling in said input station; and
   (c) grouping means for removing articles from the superposed storing shelves of the gondola dwelling in said output station and for forming article stacks of the removed articles.

2. The apparatus as defined in claim 1, wherein said grouping means comprises a series of collecting devices positioned along the gondola dwelling in said output station; each collecting device comprising
   (a) a plurality of superimposed collecting shelves;
   (b) collecting shelf-supporting means for carrying and for vertically shifting said collecting shelves with respect to one another; and
   (c) drive means connected to said collecting shelf-supporting means for placing said collecting shelves in a first vertical position in which a vertical spacing between said collecting shelves is substantially identical to a vertical spacing of the storing shelves and for placing said collecting shelves in a second vertical position in which the vertical spacing between said collecting shelves is less than the vertical spacing of the storing shelves.

3. The apparatus as defined in claim 2, wherein each said storing shelf has a plurality of side-by-side arranged emplacements each accommodating an article and further wherein a spacing between adjoining said collecting devices is twice a spacing between adjoining said emplacements.

4. The apparatus as defined in claim 2, wherein said collecting shelf-supporting means comprises lazy tongs having arms articulated to one another and carrying said collecting shelves.

5. The apparatus as defined in claim 4, wherein said lazy tongs comprise an elongated spacer extending in a direction of expansion and contraction of the lazy tongs and being non-slidably secured to one of said arms and being slidably secured to another of said arms.

6. The apparatus as defined in claim 2, wherein said drive means is a first drive means; further comprising a plurality of stacking devices aligned with respective said collecting devices for receiving articles from said collecting devices; each said stacking device comprising (a) a plurality of vertically superposed stacking shelves having a vertical spacing from one another, generally corresponding to the spacing between said collecting shelves in said second vertical position thereof;

(b) a bottom shelf situated below said stacking shelves;

(c) stacking shelf-supporting means for carrying the stacking shelves; and (d) second drive means connected to said stacking shelf-supporting means for moving said stacking shelves into advanced and retracted positions; in said advanced position of said stacking shelves, said stacking shelves being capable of supporting articles thereon; in said retracted position of said stacking shelves said stacking shelves being incapable of supporting articles thereon, whereby articles are allowed to drop onto one another upon movement of said stacking shelves from said advanced position to said withdrawn position.

7. The apparatus as defined in claim 6, further comprising means for causing consecutive superposed articles to drop onto one another in a downwardly progressing sequence upon movement of said stacking shelves from said advanced position to said withdrawn position.

8. The apparatus as defined in claim 2, further comprising pushing means for simultaneously shifting articles onto said collecting shelves from the superposed storing shelves of the gondola dwelling in said output station.

9. The apparatus as defined in claim 8, wherein said drive means is a first drive means; and further wherein said pushing means comprises a vertical pusher member and a second drive means for actuating said pusher member; said pusher member being aligned with the gondola dwelling in said output station and extending along a vertical dimension of the gondola; each said storing shelf being composed of two storing shelf halves defining a gap therebetween; the gaps defined between the storing shelf halves being in a vertical alignment with one another; said pusher member passing through said gaps when actuated by said third drive means.

10. The apparatus as defined in claim 8, wherein said drive means is a first drive means; further comprising a second drive means for shifting said collecting devices in unison along a length dimension of said series of said collecting devices into three positions in steps each having a length corresponding to one fourth of a center-to-center distance between adjoining collecting devices.

11. The apparatus as defined in claim 2, wherein said drive means is a first drive means; further comprising a plurality of stacking devices aligned with respective said collecting devices for receiving articles from said collecting devices; each said stacking device comprising (a) first and second side-by-side arranged vertical series each formed of a plurality of stacking shelf halves having a vertical spacing generally corresponding to the spacing between said collecting shelves in said second vertical position thereof; with each stacking shelf half of said first vertical series there being in a horizontal alignment a shelf half of said second vertical series;

(b) a bottom shelf situated below said first and second vertical series;

(c) first and second stacking shelf-supporting means for carrying the stacking shelf halves of said first and second vertical series, respectively; and (d) second drive means connected to said first and second stacking shelf-supporting means for horizontally moving said first and said vertical series relative to one another into first and second positions; in said first position of said first and said vertical series the horizontally aligned stacking shelf halves defining between one another a first gap sufficiently small to allow an article to be supported by the horizontally aligned stacking shelves while straddling the gap; in said second position of said first and second vertical series the horizontally aligned stacking shelf halves defining between one another a second gap sufficiently large to allow an article to drop onto an underlying article upon movement of said first and second vertical series from said first position thereof to said second position thereof.

12. The apparatus as defined in claim 11, wherein the first gaps defined between superposed pairs of horizontally aligned shelf halves are of increasing size as viewed vertically upwardly, whereby upon horizontal movement of the first and second vertical Series from the first position thereof into the second position thereof the articles drop onto one another in a downwardly progressing sequence.

13. The apparatus as defined in claim 11, further comprising pushing means for simultaneously shifting articles onto said stacking shelf halves from the collecting shelves when said first and second vertical series are in the first position thereof.

14. The apparatus as defined in claim 13, wherein said collecting shelf-supporting means comprises lazy tongs having arms articulated to one another and carrying said collecting shelves; further wherein said pushing means comprises a vertical pusher member and a third drive means for actuating said pusher member; each said collecting shelf being composed of two collecting shelf halves defining a gap therebetween; the gaps defined between the collecting shelf halves being in a vertical alignment with one another; said pusher member passing through said gaps when actuated by said third drive means.

15. The apparatus as defined in claim 14, there being provided first and second horizontally spaced lazy tongs supporting first and second vertical series of said collecting shelf halves; said first and second lazy tongs being connected to said third drive means to be simultaneously actuated by said third drive means.

\* \* \* \* \*